(12) United States Patent
Fulton et al.

(10) Patent No.: US 9,805,011 B2
(45) Date of Patent: Oct. 31, 2017

(54) HIGH-PERFORMANCE EDITING OF LARGE REMOTE FILES IN CLIENT-SERVER ARCHITECTURE

(71) Applicant: International Business Machines Corporation, Armonk, NY (US)

(72) Inventors: Michael S. Fulton, Squamish (CA); Brian W. Svihovec, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/987,418

(22) Filed: Jan. 4, 2016

(65) Prior Publication Data

US 2017/0192945 A1  Jul. 6, 2017

(51) Int. Cl.
| | | |
|---|---|---|
| G06F 17/00 | (2006.01) | |
| G06F 17/24 | (2006.01) | |
| H04L 29/06 | (2006.01) | |
| G06F 3/0483 | (2013.01) | |
| G06F 3/0484 | (2013.01) | |

(52) U.S. Cl.
CPC ............ *G06F 17/24* (2013.01); *G06F 3/0483* (2013.01); *G06F 3/04842* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 6,006,239 A | * | 12/1999 | Bhansali | ............... G06F 17/246 |
| 2003/0172113 A1 | * | 9/2003 | Cameron | .......... G06F 17/30179 709/204 |
| 2011/0126007 A1 | | 5/2011 | Eastman et al. | |
| 2012/0117481 A1 | * | 5/2012 | Stevens | ............. G06F 17/30905 715/738 |
| 2013/0275401 A1 | * | 10/2013 | Auger | ............... G06F 17/30011 707/704 |
| 2014/0280403 A1 | | 9/2014 | Swansegar et al. | |

OTHER PUBLICATIONS

IBM, "IBM Rational Developer Traveler—A nimble z/OS development environemnt, for use anywhere," IBM, Retrieved from <https://share.confex.com/share/122/webprogram/Handout/Session15247/RD%20Traveler.pdf> on Jan. 4, 2016, 16 pp.

(Continued)

*Primary Examiner* — Mustafa Amin
(74) *Attorney, Agent, or Firm* — Shumaker & Sieffert, P.A.

(57) ABSTRACT

Techniques are described for facilitating editing of a large, remote file across a client-server architecture. In one example, a method includes outputting, for communication to a system hosting a remote file, in response to an initial user input to edit the remote file, a request for a portion of the remote file, wherein the portion of the remote file is specified to include a selected opening position. The method further includes receiving a client copy of the portion of the remote file. The client copy includes a range of pages from the remote file. The range of pages includes an opening position corresponding to the selected opening position. The client copy of the portion of the remote file is loaded in client memory. The method further includes performing a user edit incorporation process iteratively for respective pages in the client copy of the portion of the remote file.

18 Claims, 10 Drawing Sheets

(56) References Cited

OTHER PUBLICATIONS

IBM, "IBM Rational Developer Traveler—Overview," IBM Rational Developer Traveler, Retrieved from <https://www.ibm.com/developerworks/community/groups/community/rdtraveler/> on Jan. 4, 2016, 2 pgs.

IBM, "ISPF for z/Os—Software development and configuration management for System z," IBM Sofrware, Retrieved from <http://www-03.ibm.com/software/products/en/ispf> on Jan. 4, 2016, 2 pgs.

Gnu, "Remote Files," GNU Emacs Manual, Retrieved from <http://www.gnu.org/software/emacs/manual/html_node/emacs/Remote-Files.html> on Jan. 4, 2016, 2 pgs.

Alex Young, "Vim 101: Editing Remote Files," usevim, DailyJS, Retrieved from <http://usevim.com/2012/03/16/editing-remote-files/> Mar. 16, 2012, 3 pgs.

National Instruments Corporation, "How Do I Use Remote VI Server Over the Network?" National Instruments Corporation, 2014, Retrieved from <http://digital.ni.com/public.nsf/allkb/082A717982B15A92862566F200816C0C> on Jan. 4, 2016, 2 pgs.

\* cited by examiner

HIGH-PERFORMANCE EDITING OF LARGE REMOTE FILES IN CLIENT-SERVER ARCHITECTURE

TECHNICAL FIELD

This disclosure relates to software development tools.

BACKGROUND

Software developer tools include integrated development environments (IDEs) that include integrated tools and viewing aids for software code and that facilitate or automate writing and editing code and various other software developer tasks. Large software projects such as enterprise software projects or major open source projects may be sophisticated, large-scale, and involve the activity of many, e.g., tens, hundreds, or thousands, of developers. Examples of enterprise software projects may include financial planning systems, budget planning systems, order management systems, inventory management systems, sales force management systems, business intelligence tools, enterprise reporting tools, project and resource management systems, big data analysis systems, large-scale network-delivered services, operational systems for major engineering products (e.g., cars or aircraft), and other enterprise software projects. The work of the large number of developers on the large code base for the software project must be appropriately organized and managed. Some individual software files in an enterprise or large open source software project may be very large, and may be hosted by a central repository system. Changes to large files in the code base for various components of the software project may be entered by different developers, who may be spread between different locations, on a routine basis.

SUMMARY

In one aspect of the invention, a method includes outputting, with one or more processing devices of a client device, for communication to a system hosting a remote file, in response to an initial user input to edit the remote file, a request for a portion of the remote file, wherein the portion of the remote file is specified to include a selected opening position in the remote file. The method further includes receiving, with the one or more processing devices of the client device, a client copy of the portion of the remote file, wherein the client copy of the portion of the remote file includes a range of pages from the remote file, wherein the range of pages includes a client copy opening position corresponding to the selected opening position in the remote file, and wherein the client copy of the portion of the remote file is loaded in a memory of the client device. The method further includes performing, with the one or more processing devices of the client device, a user edit incorporation process iteratively for one or more respective pages in the client copy of the portion of the remote file. Performing the user edit incorporation process for a respective page among the one or more respective pages in the client copy of the portion of the remote file includes receiving a user input to edit the respective page; generating a respective page modification that corresponds to the respective page and that incorporates the user input to edit the respective page; replacing the respective page in the client copy of the portion of the remote file in the memory of the client device with the respective page modification; and outputting, for communication to the system hosting the remote file, the respective page modification and an indication of a respective portion of the remote file corresponding to the respective page to replace with the respective page modification.

In another aspect, a computer program product includes a computer-readable storage medium having program code embodied therewith. The program code is executable by a computing device to output, for communication to a system hosting a remote file, in response to an initial user input to edit the remote file, a request for a portion of the remote file, wherein the portion of the remote file is specified to include a selected opening position in the remote file. The program code is further executable by a computing device to receive a client copy of the portion of the remote file, wherein the client copy of the portion of the remote file includes a range of pages from the remote file, wherein the range of pages includes a client copy opening position corresponding to the selected opening position in the remote file, and wherein the client copy of the portion of the remote file is loaded in a memory of the client device. The program code is further executable by a computing device to perform a user edit incorporation process iteratively for one or more respective pages in the client copy of the portion of the remote file. The program code executable to perform the user edit incorporation process for a respective page among the one or more respective pages in the client copy of the portion of the remote file includes program code executable to receive a user input to edit the respective page; generate a respective page modification that corresponds to the respective page and that incorporates the user input to edit the respective page; replace the respective page in the client copy of the portion of the remote file in the memory of the client device with the respective page modification; and output, for communication to the system hosting the remote file, the respective page modification and an indication of a respective portion of the remote file corresponding to the respective page to replace with the respective page modification.

In another aspect, a method includes receiving, with one or more processing devices of a server system, from a client, a request for a portion of a file hosted by the server system, wherein the request for the portion of the file includes an indication of a selected opening position in the file. The method further includes outputting, with the one or more processing devices of the server system, for communication to the client, a client copy of the portion of the file, wherein the client copy of the portion of the file includes a range of pages from the file, wherein the range of pages includes a client copy opening position corresponding to the selected opening position in the file. The method further includes generating, with the one or more processing devices of the server system, in a memory of the server system, a temporary server-side copy of the portion of the file separate from a permanent copy of the file. The method further includes receiving, with the one or more processing devices of the server system, from the client, one or more respective page modifications corresponding to one or more respective pages in the temporary server-side copy of the portion of the file. The method further includes replacing, with the one or more processing devices of the server system, the one or more respective pages in the temporary server-side copy of the portion of the file with the one or more respective page modifications. The method further includes replacing, with the one or more processing devices of the server system, in response to receiving an indication from the client to finalize edits, the portion of the file in the permanent copy of the file with the temporary server-side copy of the portion of the file.

The details of one or more embodiments of the invention are set forth in the accompanying drawings and the descrip-

DETAILED DESCRIPTION

Various examples are disclosed herein for techniques, methods, and systems generally directed to editing large files efficiently across a client-server architecture. For example, a remote editor client system of this disclosure may load a client copy of only a specific portion of a remotely hosted file, which an external developer user may edit directly on the external user's local client device. A remote editor client system of this disclosure may keep the client copy of the portion of the remote file loaded in local memory on the client device, and save user edits both to the client copy of the portion of the remote file in local memory, and to a buffered edit copy of the portion of the remote file in the remote system that hosts the remote file.

A remote editor client system of this disclosure may provide intelligent interfaces to let a user find, replace, and update lines of code in the client copy of the remote file, and save the edited client copy of the remote file to the remote file on the remote system. If the user navigates significantly away from a starting position in the client copy of the portion of the remote file, a remote editor client system of this disclosure may request a copy of an additional portion of the remote file from the file hosting system. The remote editor client system may then receive a client copy of the additional portion, load the client copy of the additional portion in local memory, and merge it with the existing client copy of the portion of the file for user navigation and editing. A remote editor client system of this disclosure may thus provide the user with a seamless file editing experience as if the entire, large remote file were locally loaded for editing, without the processing and memory burden of loading the entire large remote file to a local client, and without having to wait for network traffic between the client device and the remote system hosting the remote file for edits to be reflected in local client memory.

Figure 1:
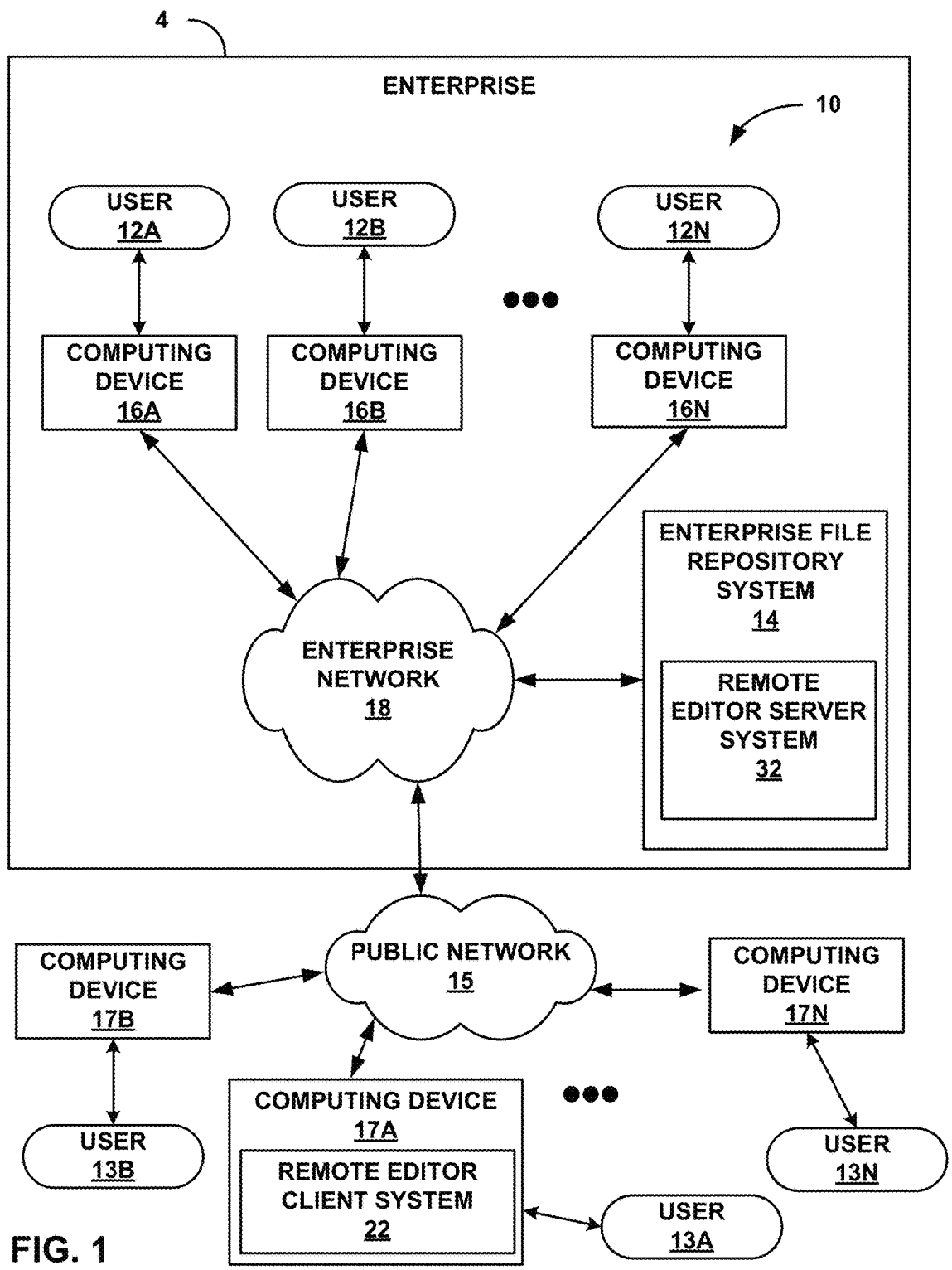
FIG. 1 shows a block diagram illustrating an example enterprise software system that includes an enterprise file repository system with a remote editor server system that interacts with a corresponding remote editor client system, in one aspect of this disclosure.

FIG. 1 shows a block diagram illustrating an example enterprise software system 4 that includes an enterprise file repository system 14 with a remote editor server system 32 that interacts with a corresponding remote editor client system 22, in one aspect of this disclosure. File repository system 14 may include a file repository system for hosting files such as large software code files under active development by potentially large numbers of software developer users. FIG. 1 illustrates an example context in which a remote editor client system 22 and a corresponding remote editor server system 32 of this disclosure may be used. In various other examples, file repository system 14 and remote editor server system 32 may be hosted as part of a large open source software project.

File repository system 14 and remote editor server system 32 are part of a computing environment 10 in which a plurality of on-site users 12A-12N within enterprise 4 ("on-site users 12") work on developing files hosted on file repository system 14. Remote editor server system 32 also enables a plurality of authorized external users 13A-13N ("external users 13") to use remote editor client system 22 to interact with remote editor server system 32 and remotely edit files hosted on file repository system 14. External users 13 may download remote editor client system 22 to their local client devices from remote editor server system 32, either remotely or while temporarily on-site in computing environment 10. Remote editor client system 22 may interact with remote editor server system 32 to enable external users 13 to edit large files hosted on file repository system 14, as described further below.

In the system shown in FIG. 1, file repository system 14 is communicatively coupled by an enterprise network 18 to a number of on-site client computing devices 16A-16N ("client computing devices 16") used by on-site users 12. File repository system 14 is further communicatively coupled via a public network 15, such as the Internet, to a number of external client computing devices 17A-17N ("external client computing devices 17") used by external users 13. On-site users 12 and external users 13 interact with their respective computing devices 16, 17 to access file repository system 14. Enterprise software system 4 and computing environment 10, including on-site users 12 and their computing devices 16, enterprise network 18, and file repository system 14 may all be either in a single facility or widely dispersed in two or more separate locations anywhere in the world, in different examples. Thus, one or more on-site users 12 as well as external users 13 may be remote from file repository system 14 and remote editor server system 32, or at least from portions thereof, in some examples. Enterprise 4 may make file repository system 14 and remote editor server system 32 available to any of on-site users 12 and/or external users 13 using a copy or an implementation of remote editor client system 22.

For exemplary purposes, various examples of the techniques of this disclosure may be readily applied to various software systems, including enterprise business software systems, large open source software projects, or other large-scale software systems. Examples of enterprise business software systems, large open source software projects, or other large-scale software systems may include enterprise financial or budget planning systems, order management systems, inventory management systems, sales force management systems, business intelligence tools, enterprise reporting tools, project and resource management systems, and large-scale engineering product operational software systems, for example.

Users 12, 13 may use a variety of different types of computing devices 16, 17 running remote editor client system 22 to interact with remote editor server system 32 and file repository system 14 and thereby to remotely edit files hosted on file repository system 14. For example, an external user 13 may run remote editor client system 22 on a respective external client device 17 in the form of a laptop computer, a desktop computer, a smartphone, a tablet computer, or other device. Remote editor client system 22 may be implemented as a dedicated application saved to and executing on external client device 17, or as a client-side web application running in a browser application saved to and executing on external client device 17, for example.

Enterprise network 18 and public network 15 may each represent any communication network, and may each include a packet-based digital network such as a private enterprise intranet or a public network such as the Internet. In this manner, computing environment 10 can readily scale to suit large enterprises or large software projects. On-site users 12 may directly access file repository system 14 via a local area network, in various examples. On-site users 12 and external users 13 may in some examples remotely access remote editor server system 32 and file repository system 14 via a virtual private network, remote broadband connection, remote dial-up, or similar remote access communication mechanism.

Figure 2:
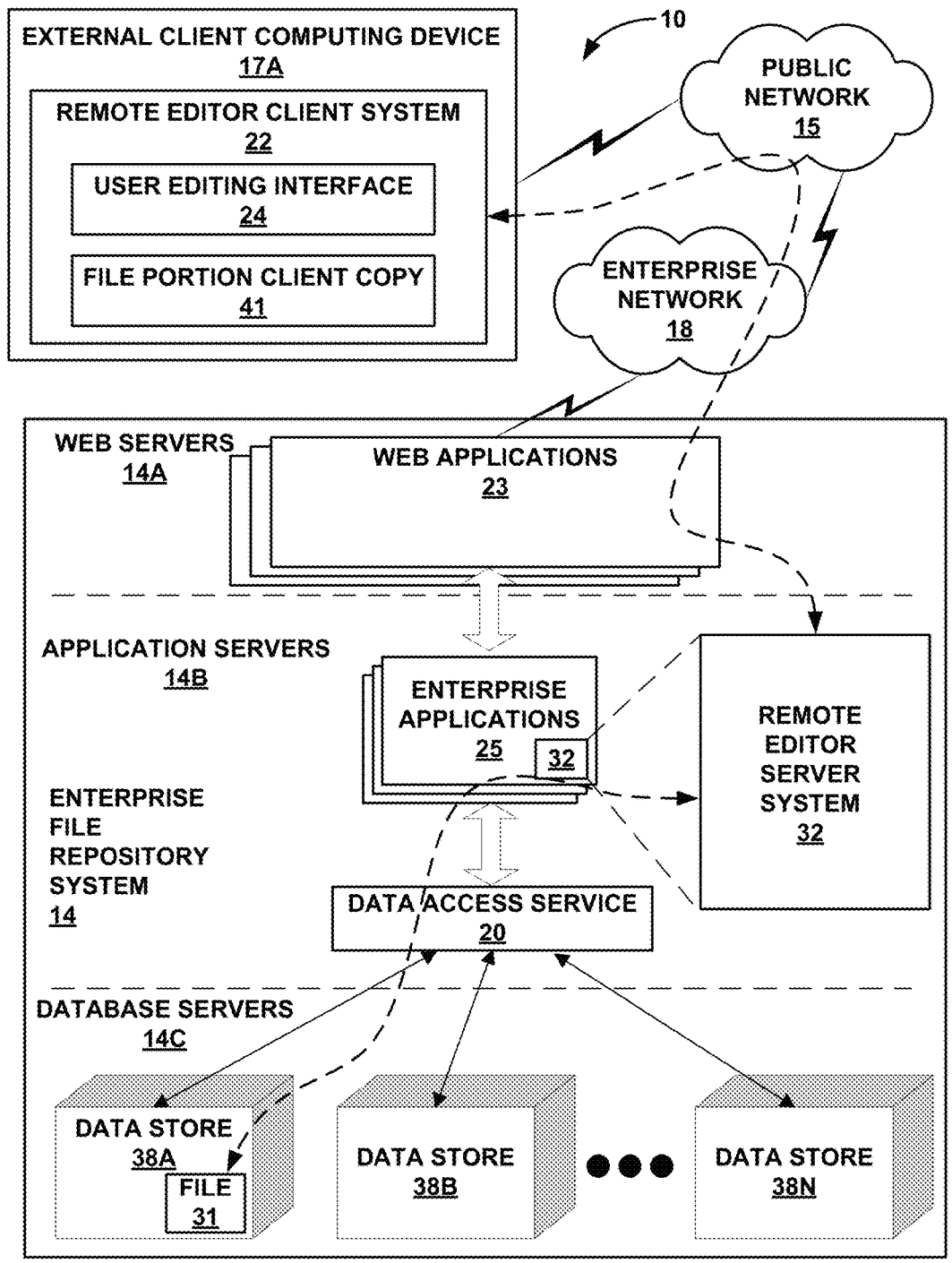
FIG. 2 shows a conceptual block diagram illustrating in further detail portions of one embodiment of an enterprise computing environment that includes a file repository system and a remote editor server system communicatively coupled to an external client computing device executing a remote editor client system, in one aspect of this disclosure.

FIG. 2 shows a conceptual block diagram illustrating in further detail portions of one embodiment of enterprise computing environment 10 that includes a file repository system 14 and remote editor server system 32 communicatively coupled to an external client computing device 17A executing remote editor client system 22, in one aspect of this disclosure. In this example implementation, a single external client computing device 17A running an implementation of remote editor client system 22 is shown for purposes of example. External client computing device 17A includes a user editing interface 24 that operates with and provides a user interface for remote editor client system 22.

Remote editor server system 32 may be hosted among enterprise applications 25, as in the example depicted in FIG. 2, or distributed among various computing resources in file repository system 14, in some examples. Remote editor server system 32 may be implemented as or take the form of a stand-alone application, a portion or add-on of a larger application, a library of application code, a collection of multiple applications and/or portions of applications, or other forms. Remote editor server system 32 may be executed by any one or more servers, client computing devices, processors or processing units, or other types of computing devices in various examples.

As depicted in FIG. 2, file repository system 14 is implemented in accordance with a three-tier architecture: (1) one or more web servers 14A that provide web applications 23 with user interface functions, which may include remote editor server system 32 or one or more portions thereof, in some examples; (2) one or more application servers 14B that provide an operating environment for enterprise software applications 25 and a data access service 20; and (3) database servers 14C that provide one or more data stores 38A, 38B, . . . , 38N ("data stores 38") which may include files such as large software code files for a large software project, including illustrative large file 31, for example. Data access service 20 may provide an interface to the data sources 38, including on behalf of remote editor server system 32, such that remote editor server system 32 may access and manipulate files such as file 31 in data stores 38.

External client computing device 17A may transmit requests through public network 15 and enterprise network 18 to remote editor server system 32, where the requests include requests to edit a file such as file 31. Remote editor server system 32 retrieves a client copy of a specific portion of file 31 from the underlying data stores 38, where the specific portion is selected in accordance with specifications of the request, as further described below. Remote editor server system 32 may receive requests, e.g., by way of an API presented to remote editor client system 22. Remote editor server system 32 may then return a resulting client copy 41 of the specific portion of file 31 ("file portion client copy 41") to remote editor client system 22 on external client computing device 17, to be made accessible to external user 13A of client computing device 17A via user editing interface 24 on external client computing device 17A.

Figure 3:
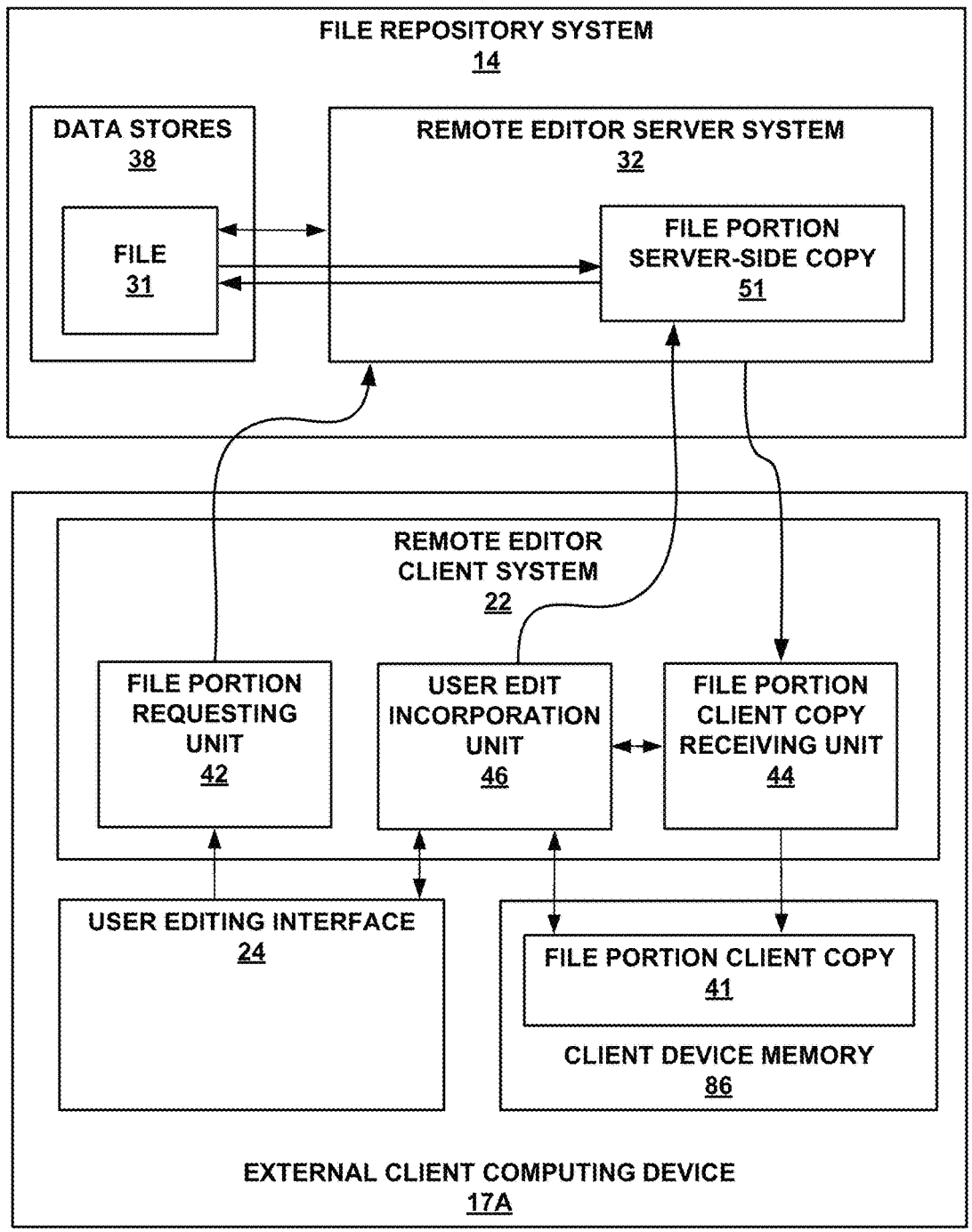
FIG. 3 shows a conceptual block diagram of an example implementation of a remote editor client system implemented on an external client computing device and configured to interact with a remote editor server system implemented in a remote file repository system and to perform a process of enabling seamless client-side editing of a remote file, in one aspect of this disclosure.

FIG. 3 shows a conceptual block diagram of an example implementation of remote editor client system 22 implemented on external client computing device 17A and configured to interact with remote editor server system 32 implemented in remote file repository system 14 and to perform a process of enabling seamless client-side editing of remote file 31, in one aspect of this disclosure. A user of external client computing device 17A may enter commands via user editing interface 24 to edit file 31, which is a remote file relative to the user because the user is at a remote location relative to file repository system 14. The user's commands may indicate a desired starting position in file 31 to start editing file 31. In some examples including by default if not differently specified by the user, remote editor client system 22 may determine the starting position for editing file 31 to be at the beginning of file 31. In some examples, the user may enter a specific search term such as a specific string as part of the user's original commands to begin editing file 31, in which case remote editor client system 22 may include the search term with the request and specify its request for a starting position that includes an occurrence or a first occurrence of the search term in file 31.

Remote editor client system 22 may include or be conceptualized in terms of a number of discrete units, modules, subsystems, or portions, including a file portion requesting unit 42, a file portion client copy receiving unit 44, and a user edit incorporation unit 46, in this example. These various units may be more or less distinct portions of executable software code within a larger body of complete software code with which remote editor client system 22 is implemented. In some examples, one or more identified units of remote editor client system 22 may overlap with one or more other identified units of remote editor client system 22, and/or may include specialized subsystems, firmware, or hardware, for example.

Remote editor client system 22 may respond to the user's original commands to begin editing file 31 by file portion requesting unit 42 of remote editor client system 22 receiving and identifying the request, identifying any specified starting position or a default starting position, and sending the request to remote editor server system 32. Thus, remote editor client system 22 may output, for communication to remote editor server system 32 hosting remote file 31, in response to an initial user input to edit remote file 31, a request for a portion of remote file 31, wherein the portion of remote file 31 is specified to include a selected opening position in remote file 31. The selected opening position may be indicated by the initial user input or may be selected by a default.

Remote editor server system 32 receives the request from remote editor client system 22, accesses file 31 among data stores 38, and makes a copy 51 of a portion of file 31, or a file portion server-side copy 51, such that the portion includes the identified starting position. In some examples, remote editor server system 32 defaults to making a copy of a beginning portion of file 31 by default if remote editor server system 32 does not receive a specified starting position as part of the request from remote editor client system 22. Remote editor server system 32 loads the initial file portion server-side copy 51 in a memory of remote editor server system 32, and also outputs a copy of the initial portion of file 31 to remote editor client system 22.

Remote editor client system 22 may receive the copy of the portion of file 31 via file portion client copy receiving unit 44. Thus, file portion client copy receiving unit 44 of remote editor client system 22 may receive client copy 41 of the portion of remote file 31. File portion client copy receiving unit 44 of remote editor client system 22 may load the copy to client device memory 88 as file portion client copy 41. File portion client copy receiving unit 44 may also convey file portion client copy 41 to user edit incorporation unit 46, which may handle outputting user interface views of file portion client copy 41.

Client copy 41 of the portion of remote file 31 includes a range of disk pages from the remote file. The disk pages, or simply pages, may be arbitrary sections of file portion client copy 41, and may be demarcated as each having a certain number of lines of code or other types of lines from file 31. For example, each page may be defined as a set of five lines of code from the initial version of file portion client copy 41. Pages may also be defined as any number of lines of code, or other natural demarcations in code, bytecode, HyperText Markup Language (HTML), Extensible Markup Language (XML), or other file format. Natural demarcations for pages may be context-specific, such as demarcations between compileable components, or between opening and closing prose for a component in XML, for example.

The division of the file portion client copy 41 into pages may be demarcated by remote editor server system 32 before transmission, or by remote editor client system 22 after receiving, or may be a pre-existing organizational or metadata feature of file 31, in various examples. The range of pages included in file portion client copy 41 includes the client copy opening position corresponding to the selected opening position in remote file 31. Client copy 41 of the portion of remote file 31 is loaded in memory 86 of external client device 17A by file portion client copy receiving unit 44 of remote editor client system 22 in this example.

User edit incorporation unit 46 may handle outputting user interface views of file portion client copy 41 via user editing interface 24. User editing interface 24 may display the user interface views of file portion client copy 41 in a graphical user interface or a terminal interface, for example. User editing interface 24 may provide a facade of a full file edit interface for the entire remote file 31 with standard code editing or file editing operations such as insert, delete, change, and goto line operations. User edit incorporation unit 46 may enable updated retrievals of additional portions of file 31 from remote editor server system 32 in response to user navigation through file portion client copy 41. User editing interface 24 may thus display the user interface views of file portion client copy 41 as if user editing interface 24 had a complete copy of file 31 loaded in local memory and ready to navigate through, view, and edit in its entirety, in the perception of the user, as further explained below.

User edit incorporation unit 46 may also handle propagating user edits via user editing interface 24 to both file portion client copy 41 and file portion server-side copy 51, as further described below. User edit incorporation unit 46 of remote editor client system 22 may thus perform a user edit incorporation process iteratively for one or more respective pages in file portion client copy 41.

User edit incorporation unit 46 performing the user edit incorporation process for a respective page among the one or more respective pages in file portion client copy 41 may include receiving a user input to edit the respective page, and generating a respective page modification that corresponds to the respective page and that incorporates the user input to edit the respective page. User edit incorporation unit 46 performing the user edit incorporation process for a respective page may further include replacing the respective page in file portion client copy 41 in client device memory 86 with the respective page modification. User edit incorporation unit 46 performing the user edit incorporation process for a respective page may further include outputting, for communication to remote editor server system 32 which hosts remote file 31, the respective page modification and an indication of a respective portion of remote file 31 corresponding to the respective page to replace with the respective page modification.

Remote editor server system 32 may receive the respective page modifications and indications of respective portions of remote file 31 corresponding to the respective pages to replace with the respective page modifications, from user edit incorporation unit 46 of remote editor client system 22. The indications of respective portions of remote file 31 corresponding to the respective pages to replace with the respective page modifications may be considered as grouped together with the page modifications themselves for purposes of further discussion below, such that mention of page modifications may also include the indications of where the page modifications belong in file 31.

Remote editor client system 22 may exercise one of various protocols for the timing or urgency of communicating the page modifications to remote editor server system 32. In various examples, remote editor client system 22 may always send each page modification to remote editor server system 32 immediately, or automatically at frequent intervals (e.g., once per second), or only on each user entry of a save command. Remote editor client system 22 may face significant network traffic or other causes of latency in communicating the page modifications to remote editor server system 32. At the same time, remote editor client system 22 may be enabled to update the modifications to file portion client copy 41 co-located on client device 17A at speeds limited only by internal loading, processing, and access speeds of client device 17A.

Figure 4:
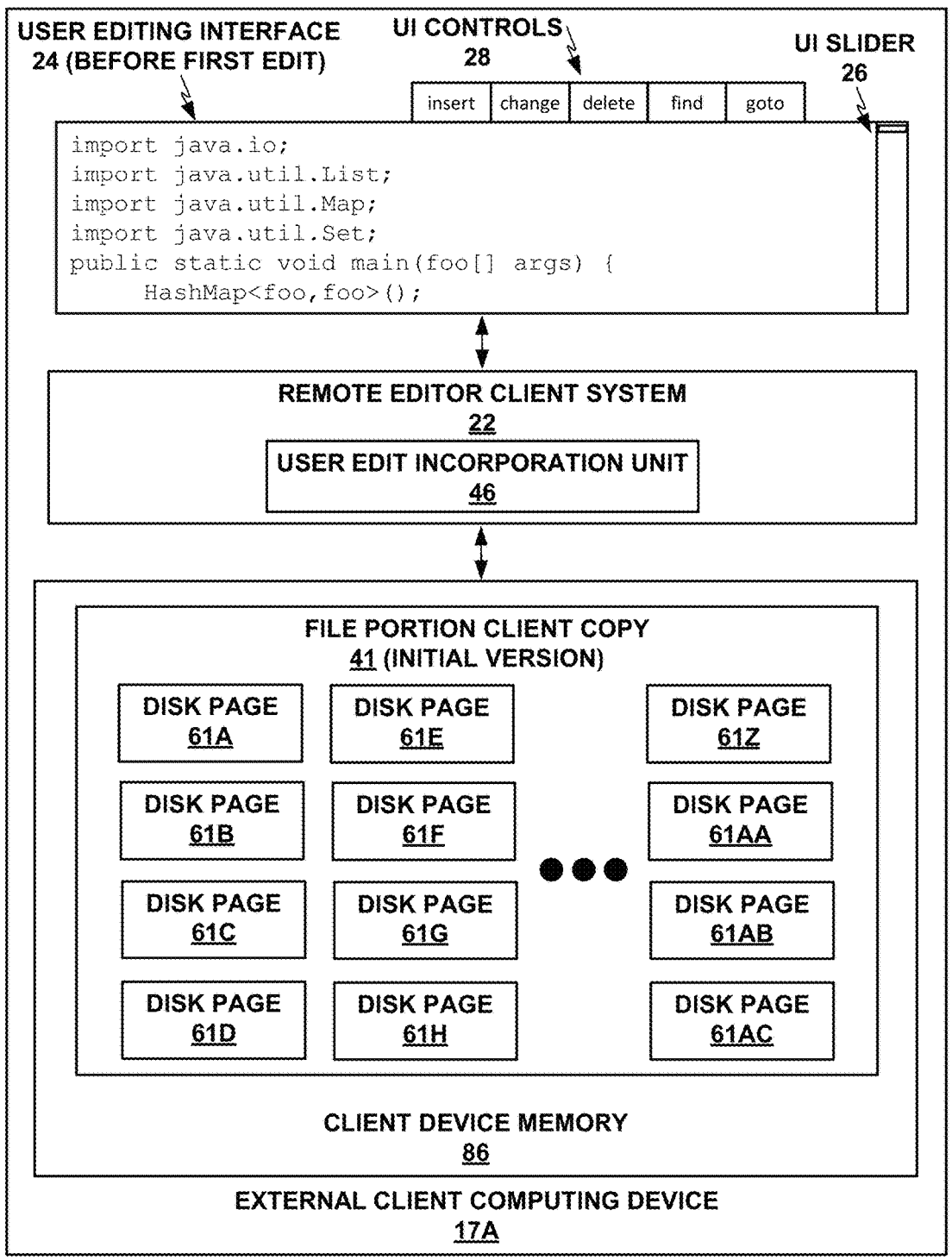
FIG. 4 shows a conceptual block diagram of an external client computing device implementing a remote editor client system interacting between a user editing interface and a file portion client copy, after the remote editor client system has initially loaded a file portion client copy but before any user edits, in one aspect of this disclosure.

FIG. 4 shows a conceptual block diagram of external client computing device 17A implementing remote editor client system 22 interacting between user editing interface 24 and file portion client copy 41, after remote editor client system 22 has initially loaded file portion client copy 41 but before any user edits, in one aspect of this disclosure. FIG. 4 shows user editing interface 24 displaying a small illustrative user interface view of a small set of lines of code (which may be, e.g., from very near a starting position at the beginning of the file) of file portion client copy 41, as retrieved from file 31 before the user makes a first edit. User editing interface 24 also includes a user interface (UI) navigation slider 26 and illustrative UI command option control buttons ("UI controls") 28. Navigation slider 26 may be scaled appropriately as if the entirety of remote file 31 were loaded rather than only the locally loaded file portion client copy 41, and thus contribute to the perception of having the entire remote file 31 available for editing. The user may navigate through file portion client copy 41 such as by using UI slider 26, UI controls 28, or up, down, page up, or page down keys on a keyboard, for example.

Remote editor client system 22 may respond to navigation commands by retrieving additional client copy portions of file 31 from remote editor server system 32 and loading those additional portions to local memory 86 as additions to file portion client copy 41, so that remote editor client system 22 presents the user with the illusion of having the entirety of remote file 31 locally loaded and available for edit. In some examples, remote editor client system 22 may continuously, at least during intervals of time, retrieve and load additional portions of file 31 in anticipation of portions the user may be predicted to navigate to or attempt to edit, based on user navigations thus far, past behavior or interest of the user, or general patterns of interest in various parts of file 31 by all users, for example.

Remote editor client system 22 may maintain a most recently used (MRU) buffer of pages in local memory 86, may track user edits in a difference log in local memory 86, and may discard neglected sections of file portion client copy 41 from local memory 86 if needed to avoid undue burden on local memory 86. That is, remote editor client system 22 may determine that a subset portion of file portion client copy 41 has not been viewed or edited in user editing interface 24 for at least a minimum length of time. Remote editor client system 22 may confirm that the subset portion of file portion client copy 41 does not have any unsaved edits. Remote editor client system 22 may then delete the neglected subset portion of file portion client copy 41 from local memory 86 of client device 17A, while a remaining portion of file portion client copy 41 remains loaded in memory 86 and open for editing.

Thus, remote editor client system 22 may receive a user navigation input that indicates a command to navigate away from the client copy opening position. Remote editor client system 22 may receive the user navigation input after receiving the client copy 41 of the initially requested portion of remote file 31. Remote editor client system 22 may output, for communication to remote editor server system 32 hosting remote file 31, in response to the user navigation input, a request for an additional portion of remote file 31. The additional portion may be adjacent to or discontinuous from the initially requested portion of the remote file. The additional portion may be in a direction of a user navigation input, or in response to a new user search input that does not yield any search results in the presently loaded version of file portion client copy 41 but may yield one or more results in other adjacent or discontinuous portions of remote file 31. Remote editor server system 32 may execute a complementary search of the entirety of file 31 in response to a user search input in parallel with remote editor client system 22 performing a search for a search term in a presently loaded version of file portion client copy 41. Remote editor server system 32 may begin sending additional portions of file 31 as it identifies one or more search results in portions of file 31 that are not among the presently loaded version of file portion client copy 41.

Remote editor client system 22 may thus receive a client copy of an additional portion of remote file 31 from remote editor server system 32. Remote editor client system 22 may load the client copy of the additional portion of remote file 31 in local memory 86 of client device 17A. Remote editor client system 22 may output, for display in user file edit interface 24, the client copy of the additional portion of remote file 31 in a continuous user file edit interface with the client copy 41 of the initially requested portion of remote file 31.

Remote editor client system 22 may, in some examples, include with its request to remote editor server system 32 for the portion of the remote file, an indication to safeguard the portion of remote file 31 at remote editor server system 32 hosting remote file 31 from conflicting edits for a period of time. The period of time may be specified to intersect a period of time after the client copy of the portion of the remote file has been generated and before a finalized form of the client copy of the portion of remote file 31 has been merged into remote file 31. Remote editor client system 22 and remote editor server system 32 may also implement intermediate merge updates from file portion client copy 41 and file portion server-side copy 51 to file 31, in some examples.

As shown in FIG. 4, file portion client copy 41 may be demarcated into disk pages 61A, 61B, . . . , 61AC ("pages 61"), where each page may be defined as a certain number of (e.g., 5) lines of code or lines of file of file portion client copy 41. Pages 61 loaded in local memory 86 may represent a small fraction of the entirety of remote file 31. If remote editor client system 22 continues retrieving and adding portions of remote file 31 after it has initially opened the original file portion client copy 41 for display and editing in user editing interface 24, remote editor client system 22 may load the additional portions in sets of one or more additional pages, which may be adjacent to or discontinuous from the originally loaded set of pages 61.

Remote editor client system 22 may also use the demarcation of file portion client copy 41 into pages 61 in managing user edits. Remote editor client system 22 managing user edits in terms of pages 61 is described below in further detail with reference to FIGS. 5-7.

Figure 5:
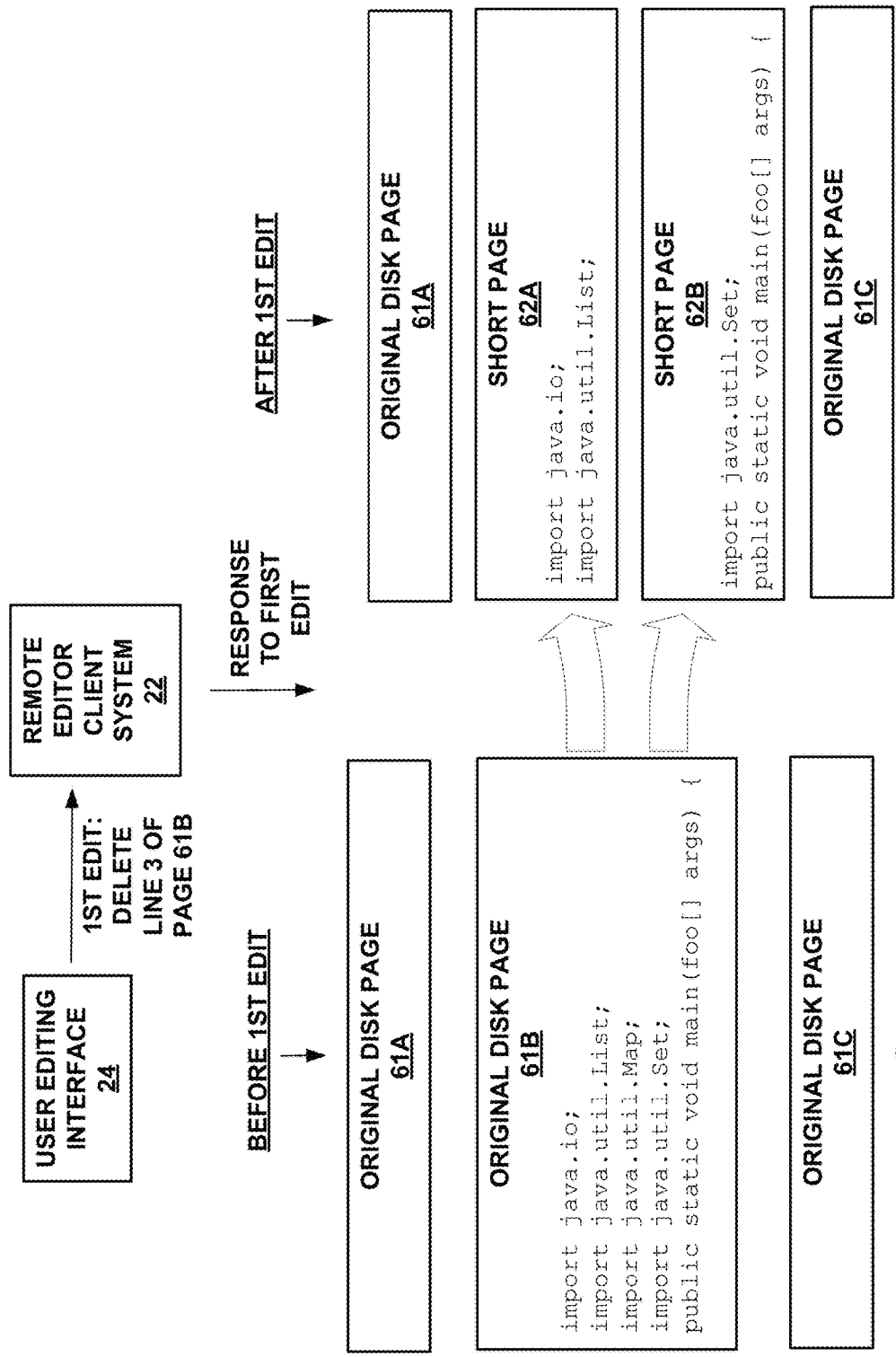
FIG. 5 shows a remote editor client system manipulating pages of a file portion client copy in response to a first user edit via a user editing interface, in one aspect of this disclosure.

FIG. 5 shows remote editor client system 22 manipulating pages 61 of file portion client copy 41 in response to a first user edit via user editing interface 24, in one aspect of this disclosure. FIG. 5 illustratively shows the first three original disk pages 61A, 61B, 61C, as may be loaded in local client device memory 86 as shown in FIG. 4. The user interface view as shown in FIG. 4 may correspond to the sixth through eleventh lines of code from file portion client copy 41 in its original form, such that the sixth through tenth lines of code shown in user editing interface 24 as shown in FIG. 4 may constitute disk page 61B in memory 86, as represented in FIG. 5.

The user may, as a first edit, enter commands to delete line 8 of file portion client copy 41, or that the user perceives merely as line 8 of remote file 31. Remote editor client system 22 interprets this equivalently as a command to delete the third line of the second disk page 61B. Remote editor client system 22 may, in response to this user edit, generate two new short pages 62A and 62B, containing the first two lines and last two lines, respectively, from original page 61B. A short page may be any page that contains a fragment of an original page, with lines unmodified from their state in the original page, and with fewer lines than the number of lines in an original page. Remote editor client system 22 may then replace original page 61B with new short pages 62A and 62B, in the same order in file portion client copy 41 in local client device memory 86. Remote editor client system 22 may also output a command or indication of this replacement for communication to remote editor server system 32, so that the same changes made to the pages of file portion client copy 41 may be incorporated by remote editor server system 32 into file portion server-side copy 51, providing a backup of all edits in near-real-time, likely with higher latency than in local memory 86, but latency that is usually invisible to the user. Thus, after remote editor client system 22 responds to the first user edit, original pages 61A-61C are replaced by original page 61A, short pages 62A and 62B, and original page 61C, in that order, in file portion client copy 41 in local memory 86 and in file portion server-side copy 51 in remote editor server system 32.

Thus, a user input to edit a respective page may include a user input to delete a particular line included in the respective page. Remote editor client system 22 may generate the respective page modification, which in this case may include generating a short page including an unmodified remainder of the respective page omitting the particular line.

Figure 6:
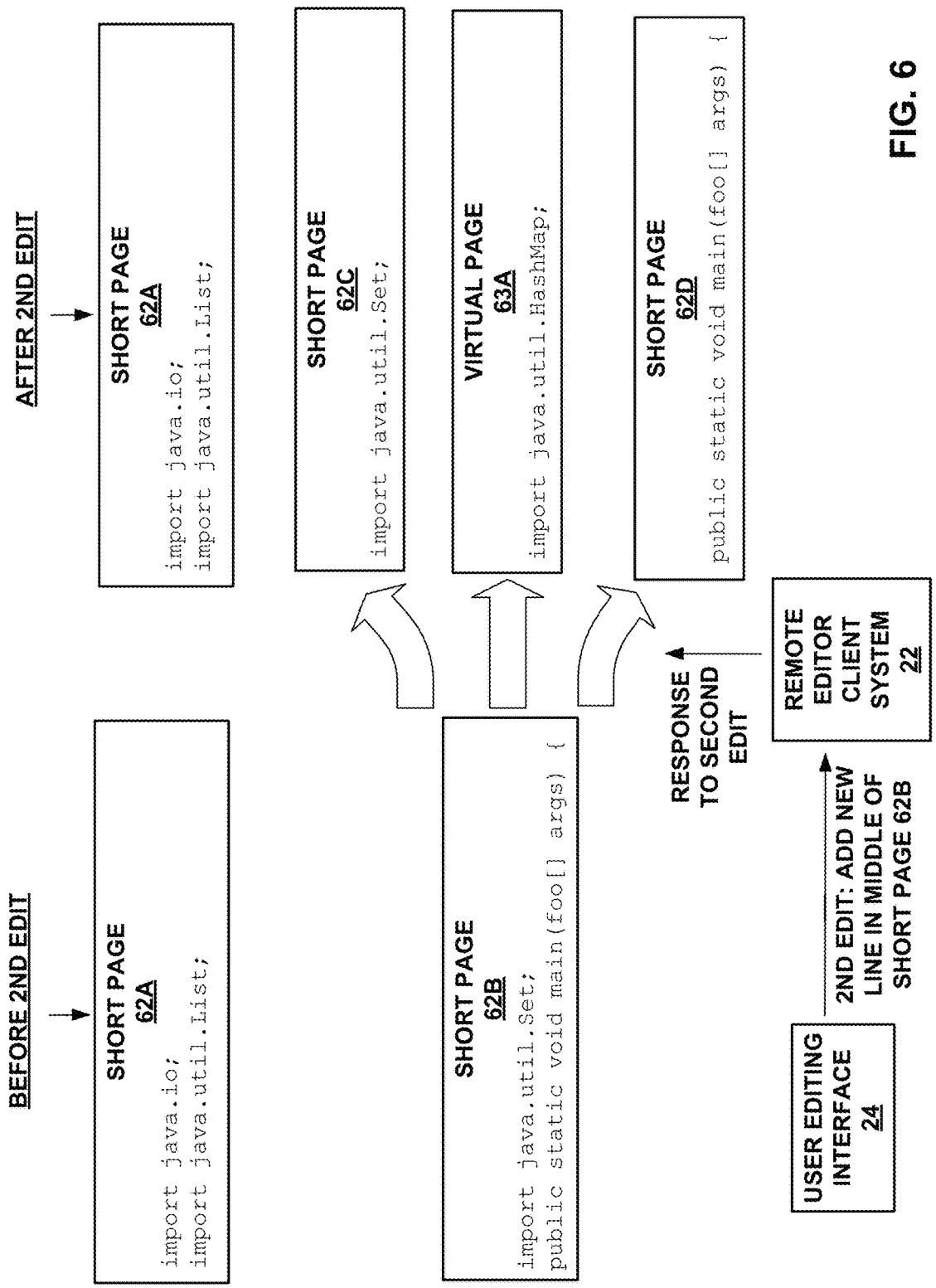
FIG. 6 shows a remote editor client system manipulating pages of a file portion client copy in response to a second user edit via the user editing interface, in one aspect of this disclosure.

FIG. 6 shows remote editor client system 22 manipulating pages 61 of file portion client copy 41 in response to a second user edit via user editing interface 24, in one aspect of this disclosure. FIG. 6 shows short pages 62A and 62B before the second edit, as may be loaded in local client device memory 86 in order in file portion client copy 41, resulting from the process described above in reference to FIG. 5.

The user may, as a second edit, enter inputs to write and add a new line of code between the prior lines 7 and 8 in user editor interface 24. Remote editor client system 22 interprets this equivalently as a command to add the new line between the two lines of code that constitute short page 62B. Remote editor client system 22 may, in response to this second user edit, generate two new short pages 62C and 62D, containing the first line and the second line, respectively, from the recently created short page 62B. Remote editor client system 22 may also create a new virtual page 63A to contain the newly added line. A virtual page may be any page of one or more lines that are newly added or are modified from their original form when file portion client copy 41 was originally loaded. After creating short page 62C, virtual page 63A, and short page 62D, remote editor client system 22 may replace short page 62B with short page 62C, virtual page 63A, and short page 62D in file portion client copy 41. Remote editor client system 22 maintains short page 62A, then short page 62C, then virtual page 63A, then short page 62D in that order in place of the original page 61B, in between still-existing original pages 61A and 61C in local memory 86.

Remote editor client system 22 may also output a command or indication of this replacement for communication to remote editor server system 32, so that the same changes made to the pages of file portion client copy 41 may be incorporated by remote editor server system 32 into file portion server-side copy 51. Thus, after remote editor client system 22 responds to the second user edit, original pages 61A-61C are replaced by original page 61A, short page 62A, short page 62C, virtual page 63A, short page 62D, and original page 61C, in that order, in file portion client copy 41 in local memory 86 and in file portion server-side copy 51 in remote editor server system 32.

Thus, a user input to edit a respective page may include a user input to add a new line to the respective page. Remote editor client system 22 may generate the respective page modification, which in this case may include generating a virtual page including the new line added by the user input to add the new line, and generating a short page including an unmodified section of the respective page, wherein the respective page modification includes the virtual page and the short page.

Figure 7:
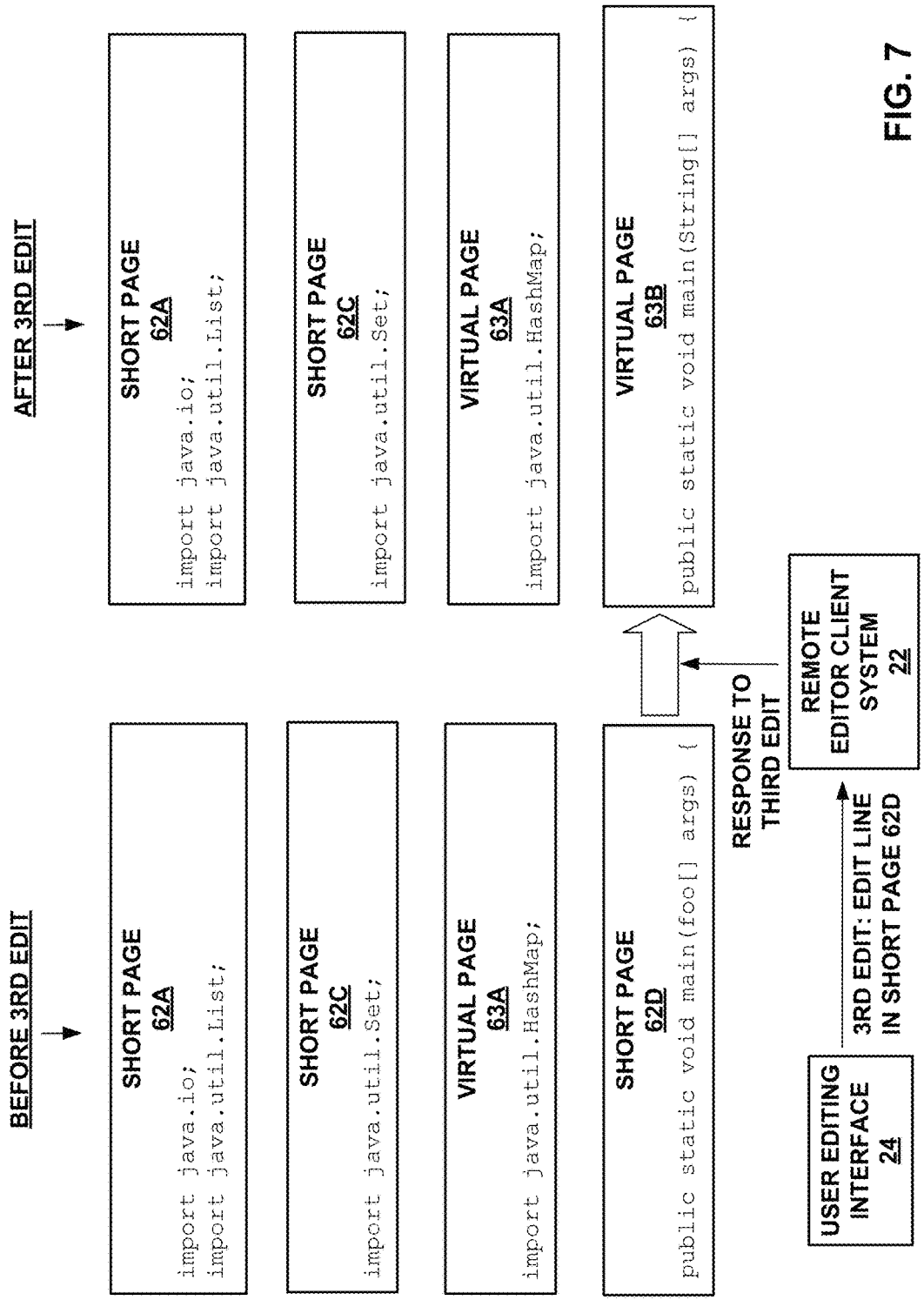
FIG. 7 shows a remote editor client system manipulating pages of a file portion client copy in response to a third user edit via the user editing interface, in one aspect of this disclosure.

FIG. 7 shows remote editor client system 22 manipulating pages 61 of file portion client copy 41 in response to a third user edit via user editing interface 24, in one aspect of this disclosure. FIG. 7 shows short page 62A, short page 62C, virtual page 63A, and short page 62D before the third edit, as may be loaded in local client device memory 86 in order in file portion client copy 41, resulting from the process described above in reference to FIG. 6.

The user may, as a third edit, enter inputs to modify only a portion of the line of code then present in line 9 in user editor interface 24. Remote editor client system 22 interprets this equivalently as a command to modify the line of code that constitutes short page 62D. Remote editor client system 22 may, in response to this third user edit, generate a new virtual page 63B, containing the newly modified line. After creating new virtual page 63B, remote editor client system 22 may replace short page 62D with virtual page 63B in file portion client copy 41. Remote editor client system 22 then maintains short page 62A, then short page 62C, then virtual page 63A, then virtual page 63B in that order, as shown on the right-hand side of FIG. 7, in place of the original page 61B, in between still-existing original pages 61A and 61C in local memory 86.

As with the prior page replacements, remote editor client system 22 may also output a command or indication of this new replacement for communication to remote editor server system 32, so that the same changes made to the pages of file portion client copy 41 may be incorporated by remote editor server system 32 into file portion server-side copy 51. Thus, after remote editor client system 22 responds to the third user edit, original pages 61A-61C are replaced by original page 61A, short page 62A, short page 62C, virtual page 63A, virtual page 63B, and original page 61C, in that order, in file portion client copy 41 in local memory 86 and in file portion server-side copy 51 in remote editor server system 32.

Thus, a user input to edit a respective page may include a user input to modify a particular line included in the respective page. Remote editor client system 22 may generate the respective page modification, which in this case may include generating a virtual page including a modified form of the particular line that corresponds to the user input to modify the particular line, and generating a short page comprising an unmodified remainder of the respective page, wherein the respective page modification includes the virtual page and the short page.

Figure 8:
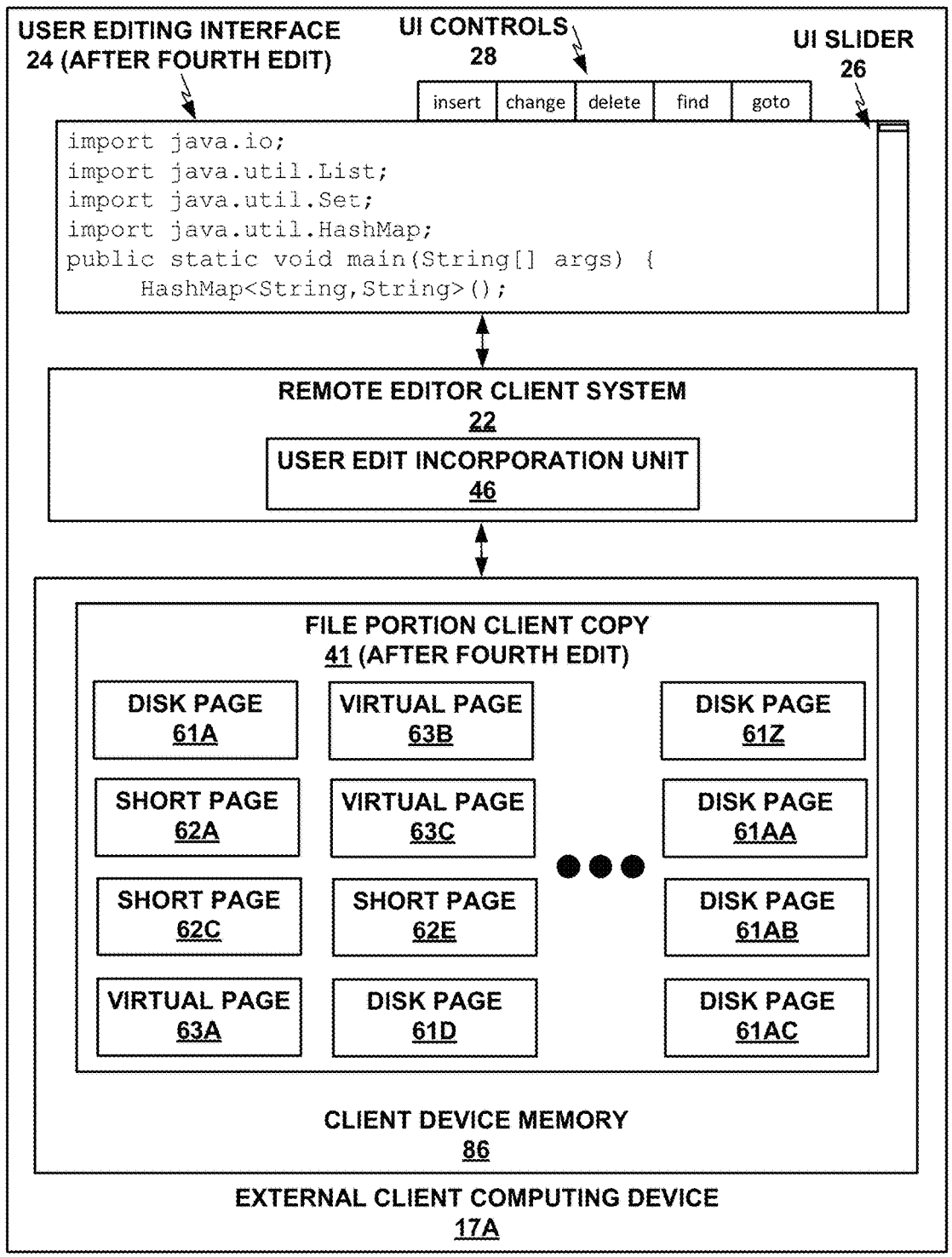
FIG. 8 shows a conceptual block diagram of an external client computing device implementing a remote editor client system interacting between a user editing interface and a file portion client copy after a first four user edits to a file portion client copy, in one aspect of this disclosure.

FIG. 8 shows a conceptual block diagram of external client computing device 17A implementing remote editor client system 22 interacting between user editing interface 24 and file portion client copy 41 after a first four user edits to file portion client copy 41, in one aspect of this disclosure. FIG. 8 shows user editing interface 24 and file portion client copy 41 after the first three edits described above with reference to FIGS. 5-7, as well as a subsequent fourth edit to modify the 11th line of code (i.e., shown at the bottom of user editing interface 24 in FIGS. 4 and 8), corresponding to the first line of original page 61C shown in FIGS. 4 and 5. Analogously to the process shown in FIG. 7, remote editor client system 22 may respond to this modification of an existing line by creating a new virtual page 63C to contain the modified line, and by creating a new short page 62E to contain the unmodified remainder of original page 61C. Remote editor client system 22 may then replace original page 61C with new virtual page 63C and new short page 62E in file portion client copy 41, preserving their order in the series of pages. All edits to pages by remote editor client system 22, including deletions, additions, and line edits, in virtual pages or short pages, may collectively be referred to as page modifications.

In some examples, remote editor client system 22 may maintain page modifications to be sent to remote editor server system 32 in a most recently used (MRU) buffer, and may detect that a prior page modification is superseded by one or more subsequent page modifications among the one or more respective page modifications in the MRU buffer, and that the prior page modification has not yet been outputted for communication to the system hosting the remote file. In this case, in some examples, remote editor client system 22 may cancel the prior page modification from outputting for communication to remote editor server system 32.

Remote editor server system 32 may respond to new updates from remote editor client system 22 by applying to one or more servers for server memory and/or disk pages to write the new modifications to file portion server-side copy 51. In some cases, remote editor client system 22 may send modifications for certain pages to remote editor server system 32, then later discard those pages from local memory 86, but then yet later, determine that those pages are needed again as part of file portion client copy 41, and send a new request for those pages to remote editor server system 32. In this case, remote editor server system 32 may check to ensure that all prior modifications have been saved to those newly requested pages in file portion server-side copy 51, prior to sending those pages back to remote editor client system 22. If remote editor server system 32 determines that one or more modifications are still pending for the requested pages, remote editor server system 32 may escalate the urgency of saving those modifications, and may exercise various protocols for appropriating more server-side resources for consolidating those modifications quickly to enable the fully updated pages to be sent back to remote editor client system 22. Remote editor client system 22 and remote editor server system 32 may thus both work to dynamically maintain the perception of making the entirety of remote file 31 locally available at client device 17A for editing, with assured fidelity of modification updates and with minimal latency.

When a user finishes editing file portion client copy 41, the user may enter a final save command or modification finalizing command prior to or automatically as part of closing the local file in user editing interface 24. Remote editor client system 22 may interpret this final save command and communicate it to remote editor server system 32. Thus, performing the user edit incorporation process may generate one or more respective page modifications that include respective page modifications for each of respective pages. Remote editor client system 22 may receive a user input to finalize editing. Remote editor client system 22 may output, for communication to remote editor server system 32 hosting remote file 31, in response to the user input to finalize editing, an indication to save the one or more respective page modifications to remote file 31.

Remote editor server system 32 may respond to the final save command by ensuring that all modifications are saved to file portion server-side copy 51, and executing any remaining modifications needed to be able to ensure that all modifications are saved. Remote editor server system 32 may then replace the corresponding portion of file 31 with file portion server-side copy 51, which by then is an ensured perfect copy of file portion client copy 41, as edited by the user of external client computing device 17A.

Remote editor server system 32 may also confirm that the replacement of the corresponding file portion in file 31 with file portion server-side copy 51 has been successful, and then communicate that confirmation to remote editor client system 22. Remote editor client system 22 may then delete file portion client copy 41 from client device memory 86.

Figure 9:
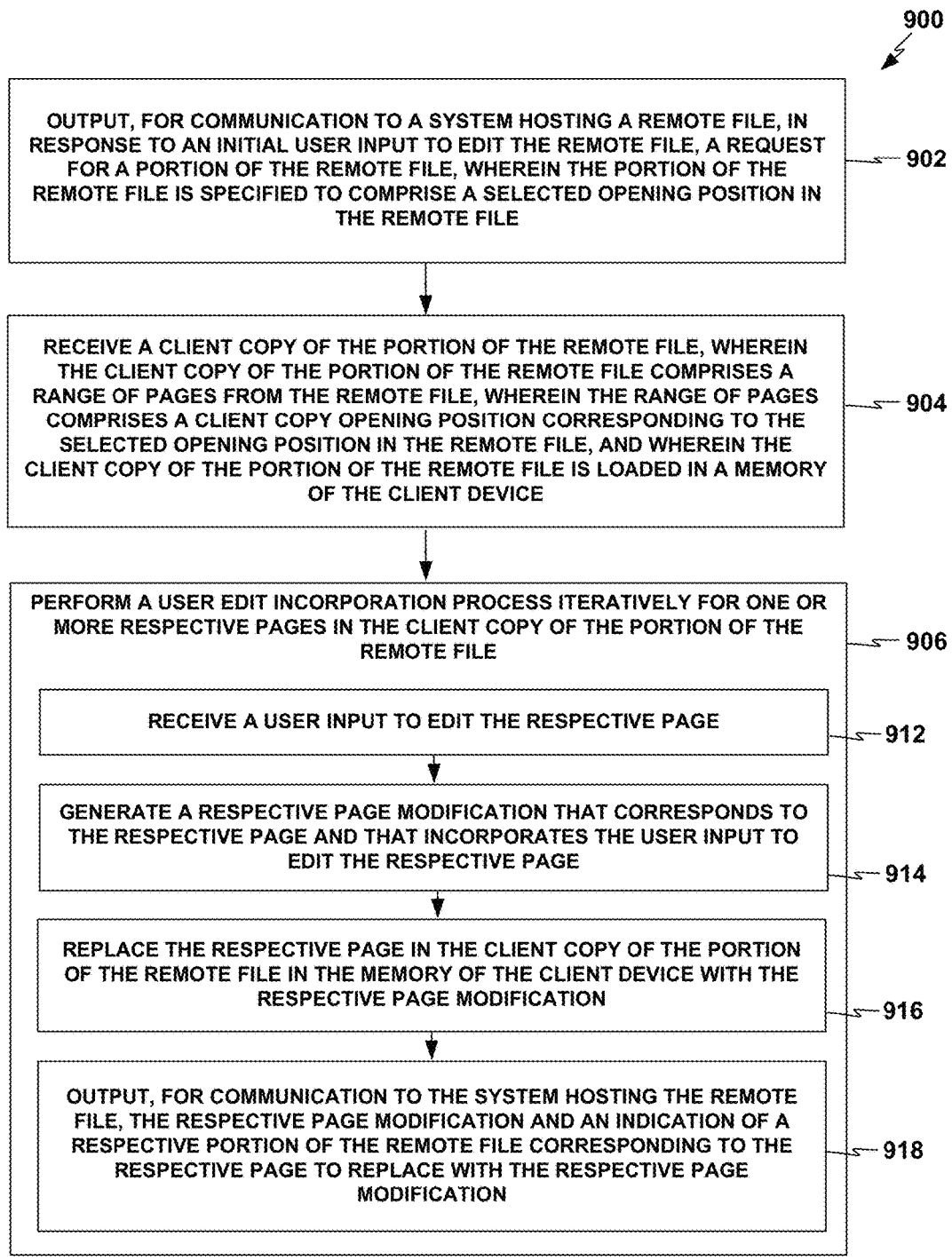
FIG. 9 depicts a flowchart of an example process for managing remote file editing across a client-server architecture that a remote editor client system, executing on one or more computing devices (e.g., servers, computers, processors, etc.), may perform, in one aspect of this disclosure.

FIG. 9 depicts a flowchart of an example process 900 for managing remote file editing across a client-server architecture that remote editor client system 22, executing on one or more computing devices (e.g., servers, computers, processors, etc.), may perform, in one aspect of this disclosure. Remote editor client system 22 may output, for communication to a system hosting a remote file, in response to an initial user input to edit the remote file, a request for a portion of the remote file, wherein the portion of the remote file is specified to include a selected opening position in the remote file (902) (e.g., remote editor client system 22 outputting a request to remote editor server system 32, as described above).

Remote editor client system 22 may further receive a client copy of the portion of the remote file, wherein the client copy of the portion of the remote file includes a range of pages from the remote file, wherein the range of pages includes a client copy opening position corresponding to the selected opening position in the remote file, and wherein the client copy of the portion of the remote file is loaded in a memory of the client device (904) (e.g., remote editor client system 22 receiving file portion client copy 41 from remote editor server system 32, as described above). Remote editor client system 22 may further perform a user edit incorporation process iteratively for one or more respective pages in the client copy of the portion of the remote file (906) (e.g., remote editor client system 22 performing a user edit incorporation process for pages, such as original pages 61B and 61C and their intermediate short pages 62 and virtual pages 63, affected by user edit inputs, as described above).

Performing the user edit incorporation process for a respective page among the one or more respective pages in the client copy of the portion of the remote file (906) may itself include receiving a user input to edit the respective page (912) (e.g., remote editor client system 22 receiving user inputs via user editing interface 24 to delete, add, or modify lines of code or other lines of the file, as described above). Performing the user edit incorporation process (906) may further include generating a respective page modification that corresponds to the respective page and that incorporates the user input to edit the respective page (914) (e.g., remote editor client system 22 generating page modifications such as short pages 62A, 62B, 62C, 62D, and 62E, and virtual pages 63A, 63B, and 63C, in response to user editing inputs and that incorporate the user inputs to edit the respective prior pages, as described above).

Performing the user edit incorporation process (906) may further include replacing the respective page in the client copy of the portion of the remote file in the memory of the client device with the respective page modification (916) (e.g., remote editor client system 22 replacing respective original pages and intermediate short pages and virtual pages with subsequent short pages and virtual pages, as described above). Performing the user edit incorporation process (906) may further include outputting, for communication to the system hosting the remote file, the respective page modification and an indication of a respective portion of the remote file corresponding to the respective page to replace with the respective page modification (918) (e.g., remote editor client system 22 communicating the page modifications to remote editor server system 32, as described above). Various implementations of process 900 may also include any of the processes described above.

In various examples, remote editor server system 32 may receive, with one or more processing devices of a server system, from a client, a request for a portion of a file hosted by remote editor server system 32 (e.g., receiving a request from file editor client system 22 executing on client device 17A). The request for the portion of the file may include an indication of a selected opening position in the file. Remote editor server system 32 may output, with the one or more processing devices of remote editor server system 32, for communication to the client, a client copy of the portion of the file. The client copy of the portion of the file may include a range of pages from the file, wherein the range of pages includes a client copy opening position corresponding to the selected opening position in the file. Remote editor server system 32 may generate, with the one or more processing devices of remote editor server system 32, in a memory of remote editor server system 32, a temporary server-side copy of the portion of the file separate from a permanent copy of the file.

Remote editor server system 32 may receive, with the one or more processing devices of remote editor server system 32, from the client, one or more respective page modifications corresponding to one or more respective pages in the temporary server-side copy of the portion of the file. Remote editor server system 32 may replace, with the one or more processing devices of remote editor server system 32, the one or more respective pages in the temporary server-side copy of the portion of the file with the one or more respective page modifications. Remote editor server system 32 may replace, with the one or more processing devices of remote editor server system 32, in response to receiving an indication from remote editor client system 22 to finalize edits, the portion of the file in the permanent copy of the file with the temporary server-side copy of the portion of the file.

Figure 10:
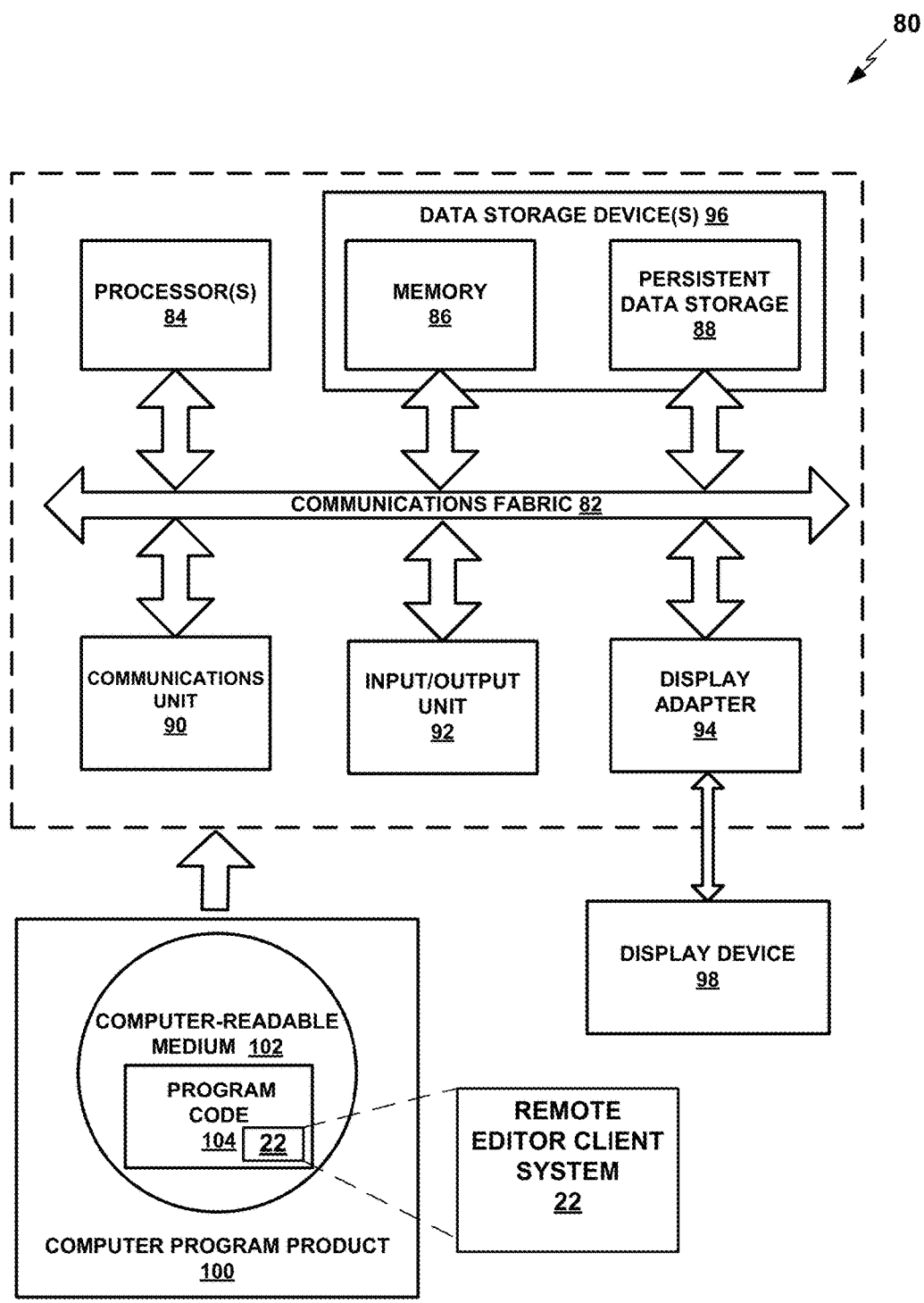
FIG. 10 is a block diagram of a computing device that may be used to execute a remote editor client system or a remote editor server system, in various aspects of this disclosure.

FIG. 10 is a block diagram of a computing device 80 that may be used to execute remote editor client system 22 or remote editor server system 32, in various aspects of this disclosure. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 10, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may include one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a remote editor server system 32 or a remote editor client system 22, as described in greater detail above. This program code may be stored on memory 86, persistent data storage 88, or elsewhere in computing device 80. This program code may also take the form of program code 104 stored on computer-readable medium 102 included in computer program product 100, and may be transferred or communicated, through any of a variety of local or remote means, from computer program product 100 to computing device 80 to be enabled to be executed by processor unit 84, as further explained below. While FIG. 10 shows program 104 as including program code for remote editor client system 22, in other embodiments, program 104 alternatively includes program code for remote editor server system 32.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions included in program code 104.

In some illustrative examples, program code 104 may be downloaded over a network to data storage 96 from another device or computer system for use within computing device 80. Program code 104 including computer-executable instructions may be communicated or transferred to computing device 80 from computer-readable medium 102 through a hard-line or wireless communications link to communications unit 90 and/or through a connection to input/output unit 92. Computer-readable medium 102 including program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
outputting, with one or more processing devices of a client device, for communication to a system hosting a remote file, in response to an initial user input to edit the remote file, a request for a portion of the remote file, wherein the portion of the remote file is specified to comprise a selected opening position in the remote file;
receiving, with the one or more processing devices of the client device, a client copy of the portion of the remote file, wherein the client copy of the portion of the remote file comprises a range of pages from the remote file, wherein the range of pages comprises a client copy opening position corresponding to the selected opening position in the remote file, and wherein the client copy of the portion of the remote file is loaded in a memory of the client device; and
performing, with the one or more processing devices of the client device, a user edit incorporation process iteratively for one or more respective pages in the client copy of the portion of the remote file,
wherein performing the user edit incorporation process for a respective page among the one or more respective pages in the client copy of the portion of the remote file comprises:
receiving a user input to edit the respective page;
generating a respective page modification that corresponds to the respective page and that incorporates the user input to edit the respective page;
replacing the respective page in the client copy of the portion of the remote file in the memory of the client device with the respective page modification; and
outputting, for communication to the system hosting the remote file, the respective page modification and an indication of a respective portion of the remote file corresponding to the respective page to replace with the respective page modification,
wherein performing the user edit incorporation process generates one or more respective page modifications comprising the respective page modification for each of the respective pages, the method further comprising:
maintaining, with the one or more processing devices of the client device, a most recent update buffer, in the memory of the client device, of the one or more respective page modifications,
detecting, with the one or more processing devices of the client device, that a prior page modification is superseded by one or more subsequent page modifications among the one or more respective page modifications in the most recent update buffer, and that the prior page modification has not yet been outputted for communication to the system hosting the remote file, wherein the one or more subsequent page modifications replaces at least a portion of content previously amended by the prior page modification; and
canceling, with the one or more processing devices of the client device, the prior page modification from outputting for communication to the system hosting the remote file based on the detecting that the prior page modification is superseded by the one or more subsequent page modifications.

2. The method of claim 1, wherein the user input to edit the respective page comprises a user input to modify a particular line comprised in the respective page, wherein generating the respective page modification comprises:
generating a virtual page comprising a modified form of the particular line that corresponds to the user input to modify the particular line; and
generating a short page comprising an unmodified remainder of the respective page, wherein the respective page modification comprises the virtual page and the short page.

3. The method of claim 1, wherein the user input to edit the respective page comprises a user input to add a new line to the respective page, wherein generating the respective page modification comprises:
generating a virtual page comprising the new line added by the user input to add the new line; and
generating a short page comprising an unmodified section of the respective page, wherein the respective page modification comprises the virtual page and the short page.

4. The method of claim 1, wherein the user input to edit the respective page comprises a user input to delete a particular line comprised in the respective page, wherein generating the respective page modification comprises:
generating a short page comprising an unmodified remainder of the respective page omitting the particular line.

5. The method of claim 1, wherein performing the user edit incorporation process generates one or more respective page modifications comprising the respective page modification for each of the respective pages, the method further comprising:
receiving a user input to finalize editing; and
outputting, for communication to the system hosting the remote file, in response to the user input to finalize editing, an indication to save the one or more respective page modifications to the remote file.

6. The method of claim 1, wherein the initial user input to edit the remote file comprises a search term from a user search input, and wherein the selected opening position in the remote file is specified to comprise a match for the search term.

7. The method of claim 1, wherein the portion of the remote file is an initially requested portion of the remote file, the method further comprising:
receiving a user navigation input that indicates a command to navigate away from the client copy opening position, wherein the user navigation input is received after receiving the client copy of the initially requested portion of the remote file;
outputting, for communication to the system hosting the remote file, in response to the user navigation input, an additional request for an additional portion of the remote file;

receiving a client copy of the additional portion of the remote file, wherein the client copy of the additional portion of the remote file is loaded in the memory of the client device; and outputting, for display in a user file edit interface, the client copy of the additional portion of the remote file in a continuous user file edit interface with the client copy of the initially requested portion of the remote file.

8. The method of claim 1, wherein the request for the portion of the remote file comprises an indication to safeguard the portion of the remote file at the system hosting the remote file from conflicting edits for a period of time intersecting a period of time after the client copy of the portion of the remote file has been generated and before a finalized form of the client copy of the portion of the remote file has been merged into the remote file.

9. The method of claim 1, wherein the one or more respective page modifications are maintained in the memory of the client device, and wherein outputting, for communication to the system hosting the remote file, the one or more respective page modifications, is performed in response to a user input for a save command.

10. The method of claim 1, further comprising:
determining that a subset portion of the client copy of the portion of the remote file has not been viewed or edited in a client user editing interface for at least a minimum length of time;
confirming that the subset portion of the client copy of the portion of the remote file does not have any unsaved edits; and
deleting the subset portion of the client copy of the portion of the remote file from the memory of the client device, while a remaining portion of the client copy of the portion of the remote file remains loaded in the memory of the client device and open for editing.

11. A computer program product comprising a computer-readable storage medium having program code embodied therewith, the program code executable by a computing device to:
output, for communication to a system hosting a remote file, in response to an initial user input to edit the remote file, a request for a portion of the remote file, wherein the portion of the remote file is specified to comprise a selected opening position in the remote file;
receive a client copy of the portion of the remote file, wherein the client copy of the portion of the remote file comprises a range of pages from the remote file, wherein the range of pages comprises a client copy opening position corresponding to the selected opening position in the remote file, and wherein the client copy of the portion of the remote file is loaded in a memory of the client device; and
perform a user edit incorporation process iteratively for one or more respective pages in the client copy of the portion of the remote file, wherein the program code executable to perform the user edit incorporation process for a respective page among the one or more respective pages in the client copy of the portion of the remote file comprises program code executable to:
receive a user input to edit the respective page;
generate a respective page modification that corresponds to the respective page and that incorporates the user input to edit the respective page;
replace the respective page in the client copy of the portion of the remote file in the memory of the client device with the respective page modification; and
output, for communication to the system hosting the remote file, the respective page modification and an indication of a respective portion of the remote file corresponding to the respective page to replace with the respective page modification, wherein performing the user edit incorporation process generates one or more respective page modifications comprising the respective page modification for each of the respective pages, the program code executable by a computing device to:
maintain a most recent update buffer, in the memory of the client device, of the one or more respective page modifications;
detect that a prior page modification is superseded by one or more subsequent page modifications among the one or more respective page modifications in the most recent update buffer, and that the prior page modification has not yet been outputted for communication to the system hosting the remote file, wherein the one or more subsequent page modifications replaces at least a portion of content previously amended by the prior page modification; and
cancel the prior page modification from outputting for communication to the system hosting the remote file based on the detecting that the prior page modification is superseded by the one or more subsequent page modifications.

12. The computer program product of claim 11, wherein the user input to edit the respective page comprises a user input to modify a particular line comprised in the respective page, wherein the program code executable to generate the respective page modification comprises program code executable to:
generate a virtual page comprising a modified form of the particular line that corresponds to the user input to modify the particular line; and
generate a short page comprising an unmodified remainder of the respective page, wherein the respective page modification comprises the virtual page and the short page.

13. The computer program product of claim 11, wherein the user input to edit the respective page comprises a user input to add a new line to the respective page, wherein the program code executable to generate the respective page modification comprises program code executable to:
generate a virtual page comprising the new line added by the user input to add the new line; and
generate a short page comprising an unmodified section of the respective page, wherein the respective page modification comprises the virtual page and the short page.

14. The computer program product of claim 11, wherein the user input to edit the respective page comprises a user input to delete a particular line comprised in the respective page, wherein the program code executable to generate the respective page modification comprises program code executable to:
generate a short page comprising an unmodified remainder of the respective page omitting the particular line.

15. A computing system comprising:
one or more processing devices; and
a computer readable storage medium storing instructions that, when executed, cause the one or more processing devices, to:
output, for communication to a system hosting a remote file, in response to an initial user input to edit the remote file, a request for a portion of the remote file, wherein the portion of the remote file is specified to comprise a selected opening position in the remote file;

receive a client copy of the portion of the remote file, wherein the client copy of the portion of the remote file comprises a range of pages from the remote file, wherein the range of pages comprises a client copy opening position corresponding to the selected opening position in the remote file, and wherein the client copy of the portion of the remote file is loaded in a memory of the client device; and perform a user edit incorporation process iteratively for one or more respective pages in the client copy of the portion of the remote file, wherein performing the user edit incorporation process for a respective page among the one or more respective pages in the client copy of the portion of the remote file comprises:

receiving a user input to edit the respective page;

generating a respective page modification that corresponds to the respective page and that incorporates the user input to edit the respective page;

replacing the respective page in the client copy of the portion of the remote file in the memory of the client device with the respective page modification; and outputting, for communication to the system hosting the remote file, the respective page modification and an indication of a respective portion of the remote file corresponding to the respective page to replace with the respective page modification, wherein performing the user edit incorporation process generates one or more respective page modifications comprising the respective page modification for each of the respective pages, and causes the one or more processing devices to:

maintain a most recent update buffer, in the memory of the client device, of the one or more respective page modifications, detect that a prior page modification is superseded by one or more subsequent page modifications among the one or more respective page modifications in the most recent update buffer, and that the prior page modification has not yet been outputted for communication to the system hosting the remote file, wherein the one or more subsequent page modifications replaces at least a portion of content previously amended by the prior page modification; and cancel the prior page modification from outputting for communication to the system hosting the remote file based on the detecting that the prior page modification is superseded by the one or more subsequent page modifications.

16. The computing system of claim 15, wherein the user input to edit the respective page comprises a user input to modify a particular line comprised in the respective page, wherein the computer readable storage medium store instructions that, when executed, further cause the one or more processing devices to:

generate a virtual page comprising a modified form of the particular line that corresponds to the user input to modify the particular line; and generate a short page comprising an unmodified remainder of the respective page, wherein the respective page modification comprises the virtual page and the short page.

17. The computing system of claim 15, wherein the user input to edit the respective page comprises a user input to add a new line to the respective page, wherein the computer readable storage medium store instructions that, when executed, further cause the one or more processing devices to:

generate a virtual page comprising the new line added by the user input to add the new line; and generate a short page comprising an unmodified section of the respective page, wherein the respective page modification comprises the virtual page and the short page.

18. The computing system of claim 15, wherein the user input to edit the respective page comprises a user input to delete a particular line comprised in the respective page, wherein the computer readable storage medium store instructions that, when executed, further cause the one or more processing devices to:

generate a short page comprising an unmodified remainder of the respective page omitting the particular line.

\* \* \* \* \*